United States Patent [19]

Bar-on

[11] 4,000,943
[45] Jan. 4, 1977

[54] TWO SPEED, DUEL PURPOSE DOCUMENT HANDLING SYSTEM

[75] Inventor: Ari Bar-on, Rochester, N.Y.
[73] Assignee: Xerox Corporation, Stamford, Conn.
[22] Filed: Feb. 13, 1975
[21] Appl. No.: 549,684
[52] U.S. Cl. .................................. 355/8; 271/275; 355/14; 355/75
[51] Int. Cl.² ...................................... G03G 15/30
[58] Field of Search ................ 355/14, 3 R, 8, 50, 355/75; 271/275, 4, 10; 198/76, 110, 203; 74/661

[56] References Cited
UNITED STATES PATENTS

| | | | |
|---|---|---|---|
| 3,468,408 | 9/1969 | Hammond et al. | 74/661 |
| 3,674,363 | 7/1972 | Baller et al. | 355/14 |
| 3,768,904 | 10/1973 | Rodek | 355/14 |
| 3,909,128 | 9/1975 | Sohm | 355/8 |

Primary Examiner—L. T. Hix
Assistant Examiner—J. A. LaBarre

[57] ABSTRACT

A document handling system for use in a document reproducing machine includes an endless belt conveyor for conveying original documents to the platen of the machine. A magnetic sensor magnetically senses the speed of the photoreceptor drum of the machine and maintains the speed of a servomotor which drives the conveyor belt through a servo amplifier at a speed which is synchronized with the drum, whereby, in a first mode of operation the optics of the machine may be fixed and the original document may be driven across the platen at a speed synchronized to the speed of the drum. A second larger motor may also drive the conveyor belt, in the alternative, at a higher speed through the servomotor in a second mode of operation in which the original document is fed at high speed to the platen and there is held stationary and is scanned by moving optics.

16 Claims, 3 Drawing Figures

TWO SPEED, DUEL PURPOSE DOCUMENT HANDLING SYSTEM

BACKGROUND AND SUMMARY OF THE INVENTION

This invention relates to a document handling system and, more particularly, to a dual purpose document handling system for a reproducing machine in which the original documents may be conveyed across the platen at a constant or synchronized speed or fed to the platen at a high speed.

Document handling systems have previously been employed in reproducing machines, such as xerographic machines, for conveying original documents relative to a window or platen at which they are viewed and imaged for reproduction. One such machine includes an endless belt conveyor which delivers the original document to be copied at high speed onto the viewing platen where the document is positioned for copying by suitable registration gates. Once the document is registered, the conveyor is stopped and the number of copies desired are made. When copying of the given original document is completed, the registration gates are retracted and the document is driven from the platen by the high speed belts and a new document is delivered into position on the platen for copying. In such document handling systems, the original document is stationary on the platen during copying and the optics of the xerographic machine usually move so as to scan the stationary document during imaging.

The advantage of such fixed document-moving optics systems are severalfold. In the first instance, such reproducing machines are generally capable of higher throughput, particularly where multiple copies are desired, since the document is delivered to the platen at high speed and the next document is delivered for copying while the first document is being removed and the moving optics are returning to the start position. Additionally, the original need not be moved between multiple copies and, thereby, the time between copies is a function of the speed of the xerographic machine itself, e.g. the speed at which the moving optics returns to the start position. Moreover, such machines have the advantage of consistent quality between multiple copies, since the original document is held in the same stationary position for all copies.

The disadvantages of such fixed document-moving optics systems are also severalfold. Such machines are capable of completely reproducing only a fixed range of original document sizes. The operator must select the document size prior to copying the document from one of a limited number of selections. Thus, the reproduction of oversized non-standard dimension original documents is difficult or impossible without patching of the copy.

Another form of machine comprises a similar endless belt conveyor for conveying the original documents across the platen. However, in this machine the speed at which the original document is conveyed across the platen is maintained at a relatively predetermined constant speed which is a function of the speed of the photoreceptor drum of the xerographic machine. In this document handling system, the optics are fixed and the original document is conveyed across the platen at this constant speed and only a small portion of the original document is viewed at any given time by the fixed optics as the document moves past the optics, thus, resulting in the scanning otherwise accomplished in the stationary document-moving optics system. This second form of document handling system is thereby referred to as a moving document-fixed optics system.

The latter system also has several advantages. One advantage is that the relatively elaborate mechanisms needed to drive the optics at a predetermined speed are no longer necessary, since the optics are stationary. Moreover, the copying of oversized original documents is facilitated, since the length of the document is no longer relevant.

The principal disadvantage of such moving document-fixed optics machines are their relatively low copying speed, particularly where multiple copies are desired. Moreover, since the original document must be fed across the platen each time another copy is to be made, handling and recycling mechanisms which are relatively complicated are necessary and consistency in quality between multiple copies is reduced.

The present invention relates to a dual purpose document handling system which is capable of operation in both the fixed document-moving optics and moving document-fixed optics modes. Thus, the document handling system of the present invention realizes the advantages of both the fixed document-moving optics and moving document-fixed optics systems and avoids substantially all of their respective disadvantages.

In the system of the present invention the speed of the moving document in the moving document-fixed optics mode is capable of accurate control thereby resulting in close synchronization of the speed of the document with the speed of the photoreceptor. Such accurate speed synchronization results in copies which are clear and accurate. Moreover, the dual purpose document handling system of the present invention is capable of performing in both aforementioned modes, and yet, is compact and duplication of parts is minimized.

In a system incorporating the principles of the present invention, support means supports individual documents in a position in which work may be performed relative to the documents, and document conveyor means conveys the documents relative to this position. Drive means drives the conveyor means to convey the documents at a constant speed to and through this position or, in the alternative, at a greater speed to the position. Selector means controls the document conveyor means to drive the individual documents at the constant speed or at the greater speed.

In another aspect of the present invention, the document handling system is incorporated in a document reproducing machine and the support means comprises an optical exposure station of the reproducing machine. A copy processing section includes photoreceptor means for transferring images to a copy sheet, drive means for driving the photoreceptor means at a substantially constant speed, and sensing and control means is located between the document conveyor means and the photoreceptor means for sensing the speed of the latter to control the document conveyor means and synchronize the speed of the document conveyor means and the speed to the photoreceptor means.

These and other objects, features and advantages of the present invention will be more clearly understood through a consideration of the following detailed description:

BRIEF DESCRIPTION OF THE DRAWING

In the course of this description, reference will frequently be made to the attached drawing in which.

DESCRIPTION OF THE PREFERRED EMBODIMENT

Figure 1:
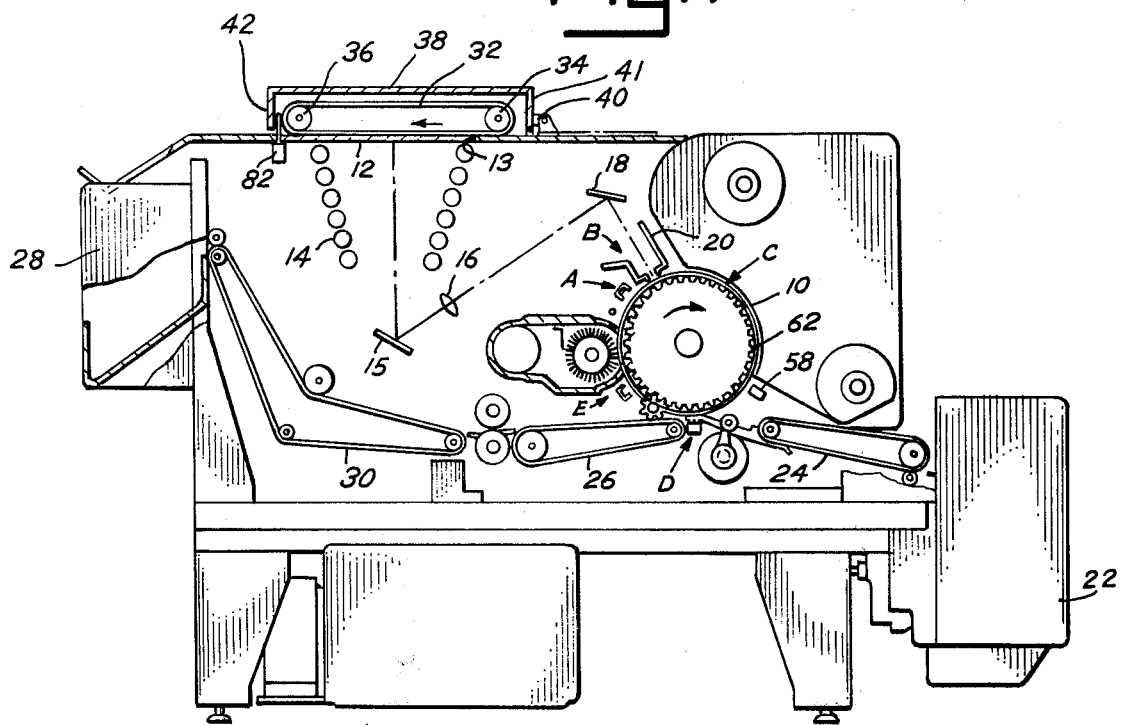
FIG. 1 is a broken elevation view of a continuous and automatic xerographic reproducing machine equipped with the document handling system of the present invention.

Referring to FIG. 1 of the drawing, there is shown an embodiment of the present invention in a suitable environment, such as an automatic xerographic reproducing machine. The automatic xerographic reproducing machine includes a xerographic photoreceptor plate or surface formed in the shape of a drum 10. The plate has a photoconductive layer or light receiving surface on a conductive backing, i.e. a photoreceptor surface, journaled in a frame to rotate in a direction indicated by the arrow. The rotation will cause the plate surface to sequentially pass a series of xerographic processing stations. For purposes of the present disclosure, several xerographic processing stations in the path of movement of the plate surface may be described functionally, as follows:

A charging station A at which a uniform electrostatic charge is deposited on the photoconductive plate;

An exposure station B at which the light or radiation pattern of a copy to be reproduced is projected onto the plate surface to dissipate the charge in the exposed areas thereof to thereby form a latent electrostatic image of the copy to be produced;

A developing station C at which xerographic developing material, including toner particles having an electrostatic charge opposite to that of the latent electrostatic image is cascaded over the plate surface, whereby the toner particles adhere to the latent electrostatic image to form a toner-powder image in a configuration of the copy being reproduced;

A transfer station D at which the toner-powder is electrostatically transferred from the plate surface to a transfer material, such as copy paper, over a support surface; and, A drum cleaning and discharge station E at which the plate surface is brushed to remove residual toner particles remaining thereon after image transfer and is exposed to a relatively bright light source to effect substantially complete discharge of any residual electrostatic charge remaining thereon.

The document handling the transport elements are shown in FIG. 1 in association with a xerographic machine with which they may be used.

A transport plate or glass platen 12 is mounted in an exposure slot 13 over which the document to be reproduced is positioned. The original document on platen 12 is illuminated by lamps 14. Light images emanating from the glass platen 12 are projected toward the xerographic surface 10 through object mirrors 15, lens 16, image mirror 18 and through a slotted light shield 20 for exposing the charged xerographic surface in conformity with the light pattern on the document being reproduced. In the present invention, either the speed of movement of the original document in the moving document-fixed optics mode or the speed of movement of the optics, e.g. mirrors 15 and 18 and lens 16, in the fixed document-moving optics mode is synchronized with speed of the xerographic surface on the drum 10 to create undistorted copies of the documents. It will be understood that although a drum 10 is shown, the xerographic surface may take the form of a moving photoreceptor belt or the like for purposes of the present invention.

A suitable transfer material such as copy paper, upon which the copies are to be formed, is stored in a housing 22. The copy paper may either be in continuous roll form or may be individual blank copy sheets cut to one or more predetermined sizes. This material is conveyed from housing 22 by belts 24 or the like past the drum 10 where the toner image is transferred from the drum to the material. The copy paper, with the image thereon, is conveyed away from the drum by belts 26 or the like at which point several conventional operations are performed on the copy, e.g. heat fusion and cutting if the copy paper is in roll form. The final copies are then conveyed to a receiving bin 28 by belts 30.

Turning now to the document handling system of the present invention, an endless belt 32 is positioned about a drive roller 34 and idler roller 36. The belt 32 and the rollers 34 and 36 are mounted for rotation in a platen cover 38 which covers the platen 12. The platen cover 38 is preferably hinged at 40 so that it may be lifted to allow for the copying of larger bound documents, such as books, to clear jams, and to service the endless belt assembly. When the cover is latched down by a suitable latch (not shown), the end walls 41 and 42 of the cover are slightly raised from the platen to allow ingress and egress of the original documents to and from the platen respectively, as shown in FIG. 1. Although a single wide endless belt 32 is shown in the drawings and is preferred, it will be understood that other conveyors may be utilized such as a plurality of narrower endless belts or a roller system, without departing from the principles of the present invention.

Figure 2:
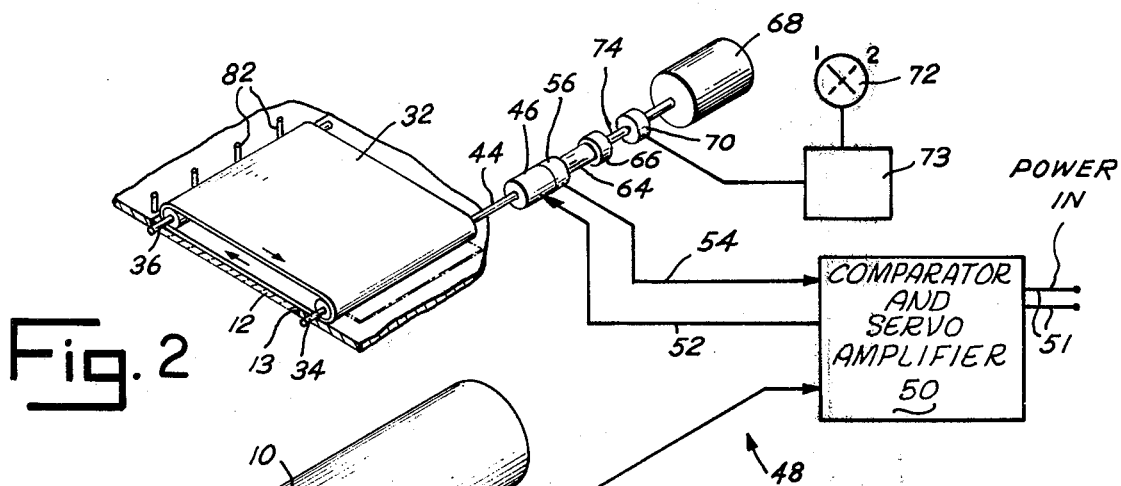
FIG. 2 is a schematic view of the document handling system and controls therefor.

The drive roller 34 is driven by a short drive shaft 44 which is coupled to and driven by a servomotor 46, as shown in FIG. 2, in the moving document-fixed optics mode of operation of the present invention. A servomotor is preferred, since it may be relatively small in size due to the relatively slow constant speed of the endless belt in the moving document-fixed optics mode, yet the servomotor 46 is also capable of accurate speed control.

It will be understood that the speed of the endless belt 32 in the moving document-fixed optics mode must be accurate and must be closely correlated with the peripheral speed of the drum 10 otherwise blurred copies will result. To accurately control the speed of the servomotor 46, a speed sensing and control system, generally 48, is provided which comprises a servo amplifier 50 which receives power through conductors 51 from a power supply (not shown) and provides power to the servomotor 46 to drive it through conductor 52. The servo amplifier 50 includes comparative circuitry (not shown) which is conventional and well within the selection of one skilled in the art. Suitable circuitry is shown by way of example in U.S. Pat. No. 3,820,893. A tachometer 56, which is coupled so as to be directly driven by the servomotor 46, is coupled to the comparative circuitry of the servo amplifier 50 to generate a signal which is indicative of the speed of the servomotor 46. A speed sensor 58 is also positioned relative to the drum 10 to accurately measure the speed of the drum and this sensor sends a signal to the comparative circuitry of the servo amplifier 50 through conductor 60 indicative of the speed of the drum 10. These speed signals from conductors 54 and 60 are compared and power is supplied to the servomotor 46 through conductor 52 as necessary to cause the servomotor 46 to rotate at a speed which is accurately synchronized to the speed of the drum 10 at all times. Any one of several different forms of speed sensors 58 may be employed. In a preferred form, the speed sensor of the present invention is a magnetic sensor which is positioned to sense the passing of the teeth of the drum drive gear 62.

Figure 3:
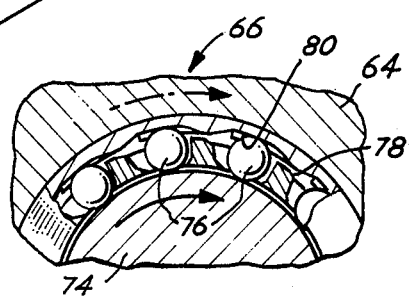
FIG. 3 is a broken cross sectioned view of a suitable over-running clutch which may be utilized in the present invention.

A drive shaft 64, as shown in FIG. 2, also extends from and is directly connected to the rotor of the servomotor 46 and an over-running clutch 66 is provided on shaft 64 of the type for example as shown in FIG. 3. A larger, more powerful motor 68 is also provided for driving the endless belt 32 in the high speed fixed document-moving optics mode of operation through the over-running clutch 66 and the servomotor 46. Such motor 68 may take the form of an a.c. induction motor and generally must be larger than the servomotor 46, since this motor 68 not only must drive the endless belt 32 at high speeds, but must do it intermittently, rather than continuously. A suitable disconnect clutch 70, such as an electromagnetic clutch, is coupled between the clutch 66 and motor 68. The electromagnetic clutch 70 is controlled by a manual mode selector switch 72 through suitable circuitry 73 to couple and uncouple motor 68 from the over-running clutch 66. Other functions of the machine are also controlled by switch 72 through circuitry 73 depending upon the mode selected, such as copy cutting, registration gate operation, optics drive systems and the like. An electromagnetic clutch 70 is preferred, since it allows motor 68 to continuously run, even when the system is in the moving document-fixed optics mode so as to minimize inertial vibrations that would result from starting and stopping of the relatively large motor 68 and also allows motor 68 to drive other mechanisms that may be in operation in the moving document-fixed optics mode. In addition, clutch 70 may be utilized to stop the belt 32 when the document has become registered for copying in the fixed document-moving optics mode.

One form of conventional over-running clutch 66 is shown in FIG. 3 simply for the purpose of a better understanding of the system of the present invention. A wide variety of such clutches are within the selection of one skilled in the art. In general, all of these over-running clutches have the common function of automatically mechanically disengaging one shaft from a second shaft, but engaging both shafts when the second shaft is driven at a higher speed. In the clutch 66 shown by way of example in FIG. 3, shaft 64 is an annular shaft which is connected to the servomotor 46 and shaft 74 is journaled in annular shaft 64 and is connected to the induction motor 68 by clutch 70. A plurality of balls or rollers 76 are positioned between the shafts 64 and 74 and held in a slotted retainer member 78 and each roller is located adjacent a wedge-shaped incline 80. The servomotor shaft 64 always rotates in the direction shown by the arrowhead of the dot and dash arrow in FIG. 3 and at least at a certain minimum speed. When shaft 64 is rotated at this minimum speed and the electromagnetic clutch 70 is disengaged in the moving document-fixed optics mode of operation, the inclines 80 will be backed off the rollers 76 and shaft 74 will not rotate. However, when the clutch 70 is engaged, the higher speed motor 68, which is continuously running, will drive the shaft 74 in the direction shown by the solid arrow in FIG. 3 at a greater speed than shaft 64. This will cause the rollers 76 to wedge beneath inclines 80, thus driving the servometer shaft 64 also at the greater speed, as shown by the dot and dash arrow in FIG. 3. Since the servomotor shaft 64 is coupled to and through the servomotor 46 to the belt drive roller 32, the belt will be driven at a higher speed in the fixed document-moving optics mode and the servomotor will merely idle in this mode while it is being driven by motor 68.

A plurality of registration gates 82, which are preferably solenoid operated, are located adjacent the discharge end of the platen 12 for use only in the fixed document-moving optics mode to register the original on the platen 12 for copying. These gates 82 may take any one of several forms and may be located either in the platen cover 38 for extension down into the original document path or beneath the deck of the platen as shown in FIG. 1 for extension up into the document path.

It is believed that the foregoing description of the document handling system of the present invention is more than ample to provide a full undertstanding of the operation of the present invention. However, for purposes of clarity, a brief description of the operation of the document handling system of the invention is as follows:

It will be first assumed that the xerograhpic machine has been started and that the operator desires to select as a first mode of operation, the moving document-fixed optics mode. The operator will operate mode selector switch 72 to position 1 as shown in FIG. 2. In position 1, the electromagnetic clutch 70 will be disengaged, causing the induction motor 68 to merely idle. In addition, other relevant portions of the xerographic machine will be controlled through suitable circuitry 73 due to the operation of switch 72 to position 1. For example, the registration gates 82 will be inactivated and removed from the document path, the copy cutting circuitry will be inactivated, the optics 15, 16 and 18 will be stationarily fixed, and power will be supplied to the servo amplifier 50 through conductors 51.

The servo amplifier 50 will now receive speed signals from the sensor 58 indicative of the speed of the drum 10 through conductor 60 and will conduct a given amount of power to the servomotor 46 to drive the belt 32 at a constant speed. If the belt 32 starts to move at a speed out of synchronization with the speed of the drum 10, a signal indicating this will be relayed from the tachometer 56 through conductor 54 and this signal and the signal from sensor 58 will be compared in the servo amplifier 50 which will adjust the power being supplied to the servomotor 46 through conductor 52 to alter the servomotor speed accordingly to maintain the speed of the belt 32 and the drum 10 in synchronization.

The original document is then fed beneath the platen cover 38 and across the platen by the substantially constant synchronized speed endless belt and imaging continuously is transmitted to the drum 10 by the fixed optics 15, 16 and 18.

If it is desired to change to the second mode of operation, the fixed document-moving optics mode, the selector switch 72 is turned to position 2. In this position circuit 73 will disconnect the power to the servo amplifier 50, actuate the copy cutting circuitry, and actuate the registration gates 82 and the optics drive mechanism. In addition, clutch 70 will also be engaged.

Since clutch 70 is now engaged, the previously running a.c. high speed motor 68 will drive shaft 74 at the high speed as indicated by the solid arrow in FIG. 3 which will cause the rollers 76 and inclines 80 to wedge to drive the shaft 64 and the now idling servomotor 46 through the over-running clutch 66. Thus, the endless belt 32 will be driven at high speed. Documents may be fed beneath the platen cover 38 where they will be conveyed, at high speed by the endless belt against registration gates 82. Once in this position, the belt is stopped. The proper positioning of the document may be sensed by suitable means, such as photoelectric means, to disengage clutch 70 to stop the belt 32 and cause the optics to move to scan the now stationary original document as many times as the number of copies that are desired.

Upon completion of copying of the document, the registration gates 82 will be removed from the document path, the clutch 70 will be engaged and the belt 32 will be driven at high speed to discharge the original document which now has been copied, and a new original document will be fed to the platen 12 and the process is repeated.

It will be understood that although the document handling system has been shown in conjunction with a xerographic reproducing machine of the type employing a drum, other forms of photoreceptors, such as belt photoreceptors, may be employed. Such belt photoreceptors are shown by way of example in U.S. Pat. No. 3,661,452.

It will be further understood that the embodiment of the present invention which has been described is merely illustrative of one of the applications of the principles of the invention. Numerous modifications may be made by those skilled in the art without departing from the true spirit and scope of the invention.

What is claimed is:

1. A reproducing apparatus for forming an image of a document on a copy sheet comprising:
    a transparent platen for supporting said document to be copied;
    a photoreceptor surface arranged for movement at a constant speed; and
    multi-mode optical means for projecting an image of said document at said platen onto said photoreceptor surface, said optical means in one mode of operation including means for scanning a document while it is held stationary on said platen and in another mode of operation including means for scanning a document which is moved across said platen at a speed synchronized to the speed of said photoreceptor surface;
    the improvement wherein said apparatus further includes:
    a multi-mode document handling system for advancing documents over said platen, said document handling system in one mode of operation corresponding to said one optical mode including: means for advancing a document at high speed onto said platen; means for registering said document on said platen; and means for holding said document stationary on said platen during scanning by said optical means; and in another mode of operation corresponding to said another optical mode including means for advancing a document over said platen at a speed synchronized to the speed of said photoreceptor surface, said high speed being greater than said synchronized speed; and
    means for selecting between said one and said another modes of operation of said document handling system.

2. A reproducing apparatus as in claim 1, wherein in said one mode of operation of said document handling system said advancement of said document at said high speed is not synchronized to the speed of said photoreceptor surface.

3. An apparatus as in claim 1, wherein said means for advancing said document at said high speed and said means for advancing said document at said synchronized speed comprise:
    a document conveyor means for conveying the documents relative to said platen;
    and drive means for driving said conveyor means to convey said documents at said high speed or at said synchronized speed.

4. An apparatus as in claim 3, wherein said document conveyor means comprises an endless belt.

5. The apparatus of claim 3, wherein said drive means includes a servo motor which drives said document conveyor means at said synchronized speed.

6. The apparatus of claim 3, wherein said advancing means in said another mode of operation includes sensing and control means coupled between said document conveyor drive means and said photoreceptor surface for sensing the speed of the latter and controlling said document conveyor drive means to maintain the speed of said document conveyor means synchronized to the speed of said photoreceptor surface.

7. The apparatus of claim 6, wherein said sensing and control means including signal input means to receive signals indicative of the speed of said photoreceptor surface and said document conveyor means, comparative means for comparing said signals, and signal output means to said document conveyor drive means to adjust the speed of said document conveyor means to a speed which is synchronized to the speed of said photoreceptor surface.

8. The apparatus of claim 7, wherein said conveyor drive means includes a servomotor and said sensing and control means comprises servo amplifier means, said servo amplifier means receiving a signal from said signal input means indicative of the speed of said servomotor and sending a signal to said servomotor from said signal output means to adjust the speed of said servomotor in synchronization with the speed of said photoreceptor surface.

9. The apparatus of claim 7, wherein said signal input means includes a tachometer for sensing the speed of said conveyor drive means.

10. The apparatus of claim 6, wherein said conveyor drive means in said another mode of operation comprises a servomotor and said sensing and control means comprises servo amplifier means coupled between said servomotor and said photoreceptor surface.

11. The apparatus of claim 6, wherein said sensing and control means comprises a magnetic sensor for sensing the speed of said photoreceptor surface.

12. The apparatus of claim 3, wherein said conveyor drive means comprise first power means for driving said document conveyor means at said synchronized speed and second power means for driving said document conveyor means at said high speed.

13. The apparatus of claim 12, including coupling means, for coupling said second power means to said first power means to drive said first power means and said document conveyor means at said high speed in said one mode and for uncoupling said second power means from said first power means to that said first power means drives said document conveyor at said synchronized speed in said another mode.

14. The apparatus of claim 13, wherein said coupling means comprises a clutch controlled in response to said selection means.

15. The apparatus of claim 14, wherein said document conveyor means comprises an endless belt.

16. The apparatus of claim 15, further including means for charging said photoreceptor surface prior to the projection of said image thereon whereby projection of said image forms a corresponding electrostatic image; means for developing said electrostatic image to render it visible; an means for transferring said visible image to said copy sheet.

* * * * *